Feb. 1, 1927.
H. R. STUART
SHOCK ABSORBER
Filed Aug. 19, 1924
1,615,855
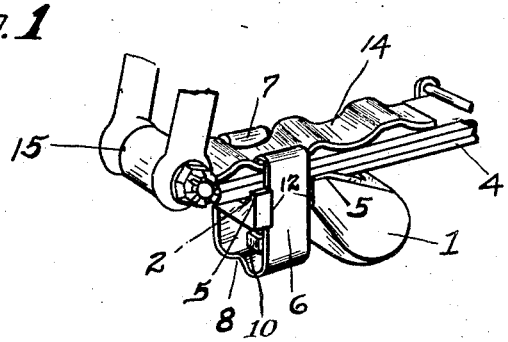
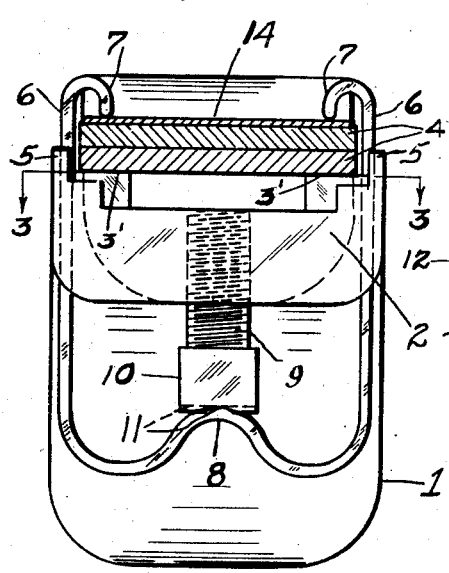
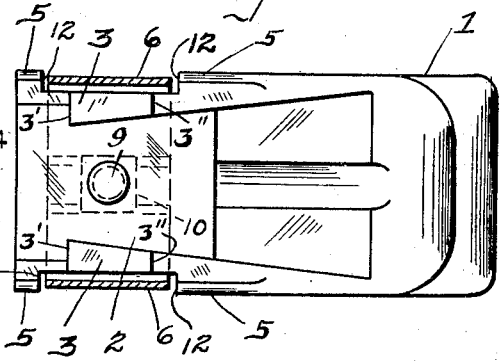
Harry R. Stuart
Inventor
By Staley & Dinnan
Attorneys Patented Feb. 1, 1927.

1,615,855

UNITED STATES PATENT OFFICE.

HARVE R. STUART, OF SPRINGFIELD, OHIO, ASSIGNOR TO THE BAUER-STUART COMPANY, OF SPRINGFIELD, OHIO, A CORPORATION OF OHIO.

SHOCK ABSORBER.

Application filed August 19, 1924. Serial No. 733,008.

This invention relates to shock absorbers, it more particularly relating to improvements upon the type of shock absorber described in my pending application Ser. No. 589,338, filed September 20, 1922.

In the pending application referred to there is shown and described a shock absorber or stabilizer consisting of a weight in the nature of a weighted arm which is resiliently clamped to at least two of the leaves of the vehicle spring, this weight acting by inertia to apply friction between the leaves of the spring during relative movements of the frame and axle and thereby dampen or absorb the shocks.

An object of the present invention is to simplify the manner of securing the weight to the vehicle spring to facilitate assembling the parts upon the spring, and further, to simplify generally the construction.

A further object of the invention is to provide simple and effective means for preventing the shock absorbing device from creeping upon the spring.

In the accompanying drawings:

Fig. 1 is a perspective view of a portion of a vehicle spring and my improved shock absorber applied thereto.

Fig. 2 is an end view of my device showing the vehicle spring in section.

Fig. 3 is a section on the line 3—3 of Fig. 2.

Fig. 4 is an end view of the head of the clamping screw.

As in my former application there is employed a weight, indicated at 1, which is in the nature of a weighted arm which projects from and is integrally formed with a head portion 2. The weighted arm projects from the head downwardly in an inclined direction and the upper side of the head is provided with raised faces 3 to provide a seat for the vehicle spring indicated at 4. The head also has pairs of upwardly projecting lugs 5 which enclose the sides of the spring. The head and its weight are clamped to the vehicle spring by a U-shaped strap 6 of spring material, the ends of the side portions of which are bent to hook form as indicated at 7 and the cross portion of which is bent to form a central rib or bead 8. The end of each hook is rounded as shown in Fig. 1 to form a narrow contact point.

Threaded in the head 2 is a screw 9 having a head 10 which is provided with a pair of grooves arranged at right angles to each other as indicated at 11.

To assemble the device upon a spring the U-shaped clamping strap is placed in position upon the head with the sides or the legs thereof projecting in the channels formed by the shouldered portions 12, with the screw 9 at or near its extreme uppermost position of adjustment so as to provide ample clearance between the head of the screw and the rib or bead 8. The metallic strap can be thus slightly tilted from its normal position to permit the hooks 7 to be placed upon the top of the vehicle spring. The screw 9 is then turned down to cause its head to engage the rib or bead 8 so that tension can be applied to the metallic strap and cause the same to firmly clamp the head and weight in position. Due to the fact that the strap 6 is formed of spring material as described, the strap will have more or less yielding movement in action so that the head and weight are yieldingly or resiliently clamped to position.

In operation, the weight acting by inertia tends to remain stationary as the spring moves and the corners 3' and 3" of the raised faces act as fulcrums between the weight and spring, so that the weight acting through the screw places an increased tension upon the clamping strap and thence upon the leaves of the spring.

In order to obviate any danger of the device creeping on the spring there is inserted between the top of the vehicle spring and the hooks 7 a strip of corrugated metal indicated at 14 one end of which is placed against the spring eye 15, the hooks 7 being caused to rest in any one of the depressions of this strip 14, a plurality of depressions being provided so as to allow the strip to accommodate itself to different positions which the shock absorbing device may occupy upon the vehicle spring. The tendency of the device is to creep toward the small end of the spring so that by having this anti-creeping device abutting the spring eye it serves to hold the metal clamping strap together with the head and weight in their proper position.

Having thus described my invention, I claim:

1. In a device of the character described, the combination, with a vehicle spring, of a weighted member fitted to said spring, a clamping member for clamping said weight to said spring consisting of a single band of resilient metal embracing the weight and spring, and a screw threaded in one of said members and adapted to be turned in engagement with the other of said members to resiliently clamp the weighted member to said spring.

2. In a device of the character described, the combination, with a vehicle spring, of a weighted member fitted to said spring, a clamping member for clamping said weight to said spring consisting of a single band of resilient metal embracing the weight and spring, and a screw threaded in the weighted member and adapted to be turned into engagement with a part of said clamping member to resiliently clamp the weighted member to said spring.

3. In a device of the character described, the combination, with a carrying spring, of a weight fitted to one side of said spring, a U-shaped resilient clamping member having its free ends inturned to engage the other side of said spring, and a screw carried by said weight to engage the cross portion of said U-shaped clamping member to apply tension thereto to clamp said weight to said spring.

4. In a device of the character described, the combination, with a carrying spring, of a weight fitted to one side of said spring, a U-shaped clamping member having its free ends inturned to engage the other side of said spring, the cross portion of said U-shaped clamping member being bent to form an inner central rib, and a screw carried by said weight having a head to engage the said rib and apply tension to said clamping member to clamp said weight to said spring.

5. In a device of the character described, the combination, with a carrying spring, of a weight fitted to one side of said spring, a U-shaped clamping member having its ends inturned to engage the other side of said spring, the cross portion of said U-shaped clamping member being bent to form an inner central rib, and a screw carried by said weight having a head to engage the said rib and apply tension to said clamping member to clamp said weight to said spring, the head of said screw being provided with a plurality of grooves to receive said rib.

6. In a device of the character described, the combination, with a vehicle spring, of a weighted member having raised faces adapted to be fitted to said spring, a clamping member for clamping said weight to said spring consisting of a single U-shaped band of resilient metal embracing the weight and spring, the free ends of the legs of said U-shaped member having rounded inturned extensions to engage the spring and the cross portion of said U-shaped member being bent to form an inturned rib, and a screw threaded in the weighted member and adapted to be turned into engagement with said rib to resiliently clamp the weighted member to said spring.

7. In a device of the character described, the combination, with a vehicle spring, of a weighted member, a clamping member for resiliently clamping said weighted member to said spring, and means in addition to the clamping member and engageable with said clamping member and with a portion of said spring for preventing said weight from creeping on said spring.

8. In a device of the character described, the combination with a vehicle spring, of a weighted member fitted to said spring, a clamping member for clamping said weight to said spring comprising portions which embrace said spring, and a metallic strip located upon said spring and extending in the direction of the length thereof with one end abutting the eye of said spring, said metallic strip having an interlocking engagement with said clamping member to prevent said weight and clamping member from creeping on said spring.

9. In a device of the character described, the combination, with a vehicle spring, of a weighted member fitted to said spring, a clamping member for clamping said weight to said spring comprising a band of resilient metal embracing the weight and spring, a screw threaded in one of said members and adapted to be turned in engagement with the other of said members to resiliently clamp the weighted member to said spring, and means for holding said screw in its adjusted position.

10. In a device of the character described, the combination, with a vehicle spring, of a weighted member fitted to said spring, a clamping member for clamping said weight to said spring comprising a band of resilient metal embracing the weight and spring, a screw threaded in the weighted member and adapted to be turned into engagement with a part of said clamping member to resiliently clamp the weighted member to said spring, and means for holding said screw in its adjusted position.

11. In a device of the character described, the combination, with a vehicle spring, of a weighted member fitted to said spring, a clamping member for clamping said weighted member to said spring comprising a band embracing the weight and spring, said band having an engagement with the spring, and an adjustable device interposed between said weighted member and band to clamp the weighted member to said spring.

12. In a device of the character described, the combination, with a vehicle spring, of a weighted member fitted to said spring, a clamping member comprising a band embracing the spring and weighted member, said band having an engagement with the spring, and an adjustable screw interposed between said weighted member and band to clamp the weighted member to the spring.

13. In a device of the character described, the combination, with a vehicle spring, of a weighted member fitted to said spring, a clamping member comprising a substantially U-shaped metallic band embracing the weighted member and spring, means at the ends of said band to engage said spring, and an adjustable device interposed between said weighted member and the intermediate portion of said band.

14. In a device of the character described, the combination, with a vehicle spring, of a weighted member fitted to said spring, a clamping member comprising a substantially U-shaped metallic band embracing said spring and the weighted member and having means at its ends to engage said spring, and an adjustable screw interposed between said weighted member and the intermediate portion of said band and having a threaded engagement with one of said parts to clamp the weighted member to said spring.

15. In a device of the character described, the combination, with a vehicle spring, of a weighted member fitted to said spring, a clamping member comprising a substantially U-shaped band together with means at its ends bearing on said spring, and an adjustable screw threaded in said weighted member and acting upon the intermediate portion of said band to clamp the weighted member to said spring.

16. A stabilizer of the cantilever principle, comprising an arm carrying at one end a weight, a clamp for attaching the other end of the arm to a vehicle spring and the end of the arm opposite the weight bent into a hook shape to prevent the arm from pulling through the clamp.

In testimony whereof, I have hereunto set my hand this 22nd day of July 1924.

HARVE R. STUART.